United States Patent [19]

Zeringue

[11] Patent Number: 5,551,124
[45] Date of Patent: Sep. 3, 1996

[54] FAUCET SAFETY HANDLE

[76] Inventor: Clay M. Zeringue, 710 Ave. F, Westwego, La. 70094

[21] Appl. No.: 429,325

[22] Filed: Apr. 26, 1995

[51] Int. Cl.$^6$ ........................................ E05B 1/00
[52] U.S. Cl. ................................ 16/121; 251/96
[58] Field of Search ................. 16/121; 291/96

[56] References Cited

U.S. PATENT DOCUMENTS

| | | | |
|---|---|---|---|
| 1,759,433 | 5/1930 | Carmosin | 291/96 |
| 2,064,623 | 12/1936 | Mueller | 291/96 |
| 2,587,285 | 2/1952 | Broscoe | 292/347 |
| 2,610,877 | 9/1952 | Weaver | 292/1 |
| 2,829,538 | 4/1958 | Mueller | 291/96 |
| 3,199,121 | 8/1965 | Greto | 4/191 |
| 3,306,643 | 2/1967 | Reed | 292/1 |
| 4,082,351 | 4/1978 | Chrones | 297/347 |
| 4,526,256 | 7/1985 | Urdal | 192/40 |
| 4,549,716 | 10/1985 | Warren | 291/96 |
| 4,616,673 | 10/1986 | Bondar | 16/121 |
| 5,093,959 | 3/1992 | McTargett et al. | 16/121 |
| 5,263,853 | 11/1993 | Pall | 137/382 |

FOREIGN PATENT DOCUMENTS

| | | | |
|---|---|---|---|
| 124485 | 9/1931 | Germany | 291/96 |
| 527132 | 3/1939 | United Kingdom | 291/96 |

*Primary Examiner*—M Rachuba
*Assistant Examiner*—Adesh Bhargava
*Attorney, Agent, or Firm*—Joseph N. Breaux

[57] ABSTRACT

A faucet safety handle for use in conjunction with a valve having a rotatable valve stem. The faucet safety handle includes a knob having an aperture therethrough, a clutch mechanism interposed between the knob and the valve stem such that in use the knob rotates freely with respect to the valve stem when the knob is in a first predetermined position and the valve stem rotates in conjunction with the knob when the knob is in a second predetermined position, and a connecting mechanism for functionally securing the knob to the valve stem.

1 Claim, 5 Drawing Sheets

FAUCET SAFETY HANDLE

TECHNICAL FIELD

The present invention relates to safety devices for preventing the operation of a faucet and more particularly to a safety device for preventing the operation of a bathroom faucet that utilizes a clutch mechanism.

BACKGROUND ART

The convenience of hot and cold running water in residences is taken for granted in modern times. Nevertheless, the necessity of running water poses unintended safety hazards for children and the infirm. Ordinarily residential faucets are opened and closed numerous times each day. The inherent simplicity of rotating a knob and receiving water is invaluable, however, the ability to fill a basin or tub with hot or cold potable water by a simple turn of a knob can pose substantial risk of harm to children or the mentally infirm. The accidental scalding and drowning of unsupervised infants is all to familiar. It would be a benefit, therefore, to have a water faucet safety handle that is simple to operate, but that requires more than simple rotation alone, to permit the free flow of hot or cold water.

Although numerous devices for preventing the operation of knobs have been developed these devices either require the removal of parts prior to operating the knob and replacement of these same parts to prevent operation each time the knob is rotated, or they are difficult to operate in slippery soapy water environments which are commonly encountered in and around tubs and wash basins.

GENERAL SUMMARY DISCUSSION OF INTENTION

It is thus an object of the invention to provide a faucet safety handle that prevents accidental or inadvertent operation of a faucet and that is simple to operate in a slippery environment.

It is a further object of the invention to provide a faucet safety handle that may be readily adaptable to an existing faucet valve stem.

It is a still further object of the invention to provide a faucet safety handle that prevents operation by an infant, but is easily operable by an adult without requiring removal of any part prior to operation.

It is a still further object of the invention to provide a faucet safety handle that prevents the accidental scalding or drowning of an infant or toddler.

Accordingly, a faucet safety handle for use in conjunction with a valve having a rotatable valve stem is provided. The faucet safety handle includes a knob having an aperture therethrough, a clutch mechanism, and a connecting means for functionally securing the knob to the valve stem. In use, the clutch mechanism is interposed between the knob and the valve stem such that the knob rotates freely with respect to the valve stem when the knob is in a first predetermined position and the valve stem rotates in conjunction with the knob when the knob is in a second predetermined position.

Ordinarily a faucet knob is directly attached to the valve stem. Rotation of the knob and nothing more either opens or closes the valve. The clutch mechanism of the faucet safety handle of the present invention introduces an additional requirement to operate the valve. In the first predetermined position, the clutch mechanism permits the knob to rotate without engaging the valve stem. The phrase "first predetermined position" is used herein to mean the position of the knob of the installed faucet safety handle at rest, or free from external forces. The phrase "second predetermined position" is used herein to mean the position of the knob of the installed faucet safety handle when an additional external force moves the knob toward the valve stem such that the clutch mechanism engages the knob to the valve stem. Thus, two motions, rotation and repositioning of the knob toward the valve stem are required to operate the valve. The clutch mechanism may take many forms. The clutch mechanism includes a biasing mechanism which urges the knob to return to the first predetermined position when the external force is removed.

The connecting means functionally secures the knob and portions of the clutch mechanism to the valve stem and may further serve as a positioning aid for the clutch mechanism. "Functionally secure" is meant herein as the prevention of removal but not movement of either the knob or clutch mechanism with respect to the valve stem.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
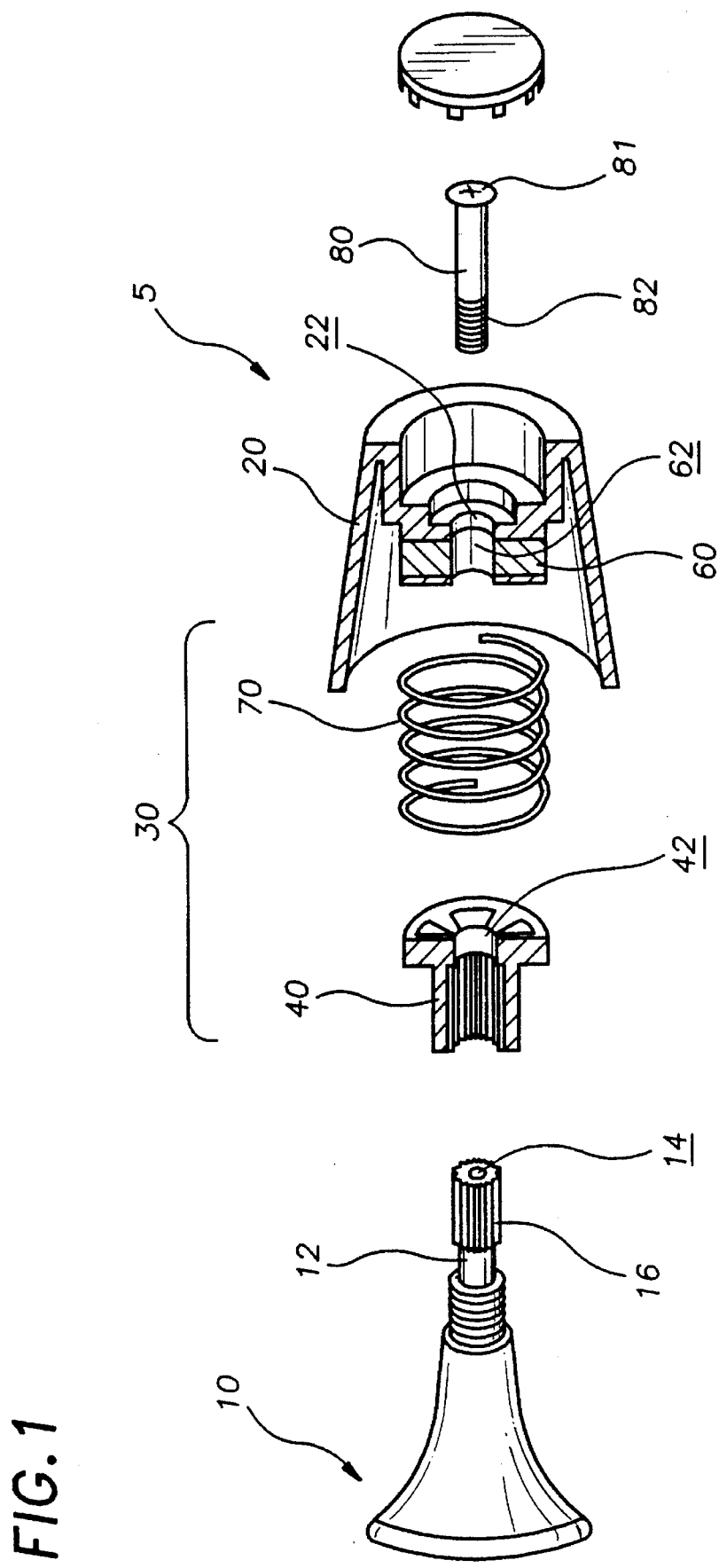
FIG. 1 is an exploded perspective view of an embodiment of the faucet safety handle and a representative rotatable valve stem.

Referring to the drawings, FIG. 1 depicts an exploded view of an exemplary embodiment of the faucet safety handle, generally referenced by the number 5, in combination with a representative valve 10, of the type having a rotatable valve stem 12. Rotatable valve stem 12 has a threaded aperture 14 on end and raised ridges 16. Faucet safety handle 5 includes a knob 20 having an aperture 22 therethrough, a clutch mechanism generally referenced by the number 30, and a bolt 80 having a head 81 and a threaded end 82. Clutch mechanism 30 includes a valve stem clutch element 40 having an aperture 42 therethrough, a knob clutch element 60 having an aperture 62 therethrough, and a helical coil spring 70. In use bolt 80 passes through knob aperture 22, knob clutch element aperture 62, spring 70, valve stem clutch element aperture 42, and is threaded into valve stem threaded aperture 14.

Figure 2:
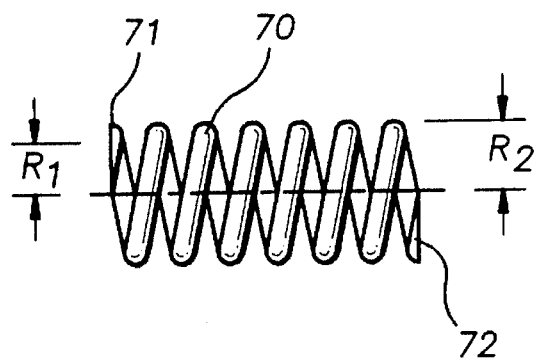
FIG. 2 is an elevation view of a spring utilized in the embodiment shown in FIG. 1 as the biasing means.

FIG. 2 is an elevation view of spring 70 which is used in this embodiment to bias knob clutch element 60 away from valve stem clutch element 40. Spring 70 has a five-eights inch (⅝") internal radial spring dimension $R_1$, and a three-quarter inch (¾") external radial spring dimension $R_2$. Spring 70 has a first end 71 and a second end 72.

Figure 3:
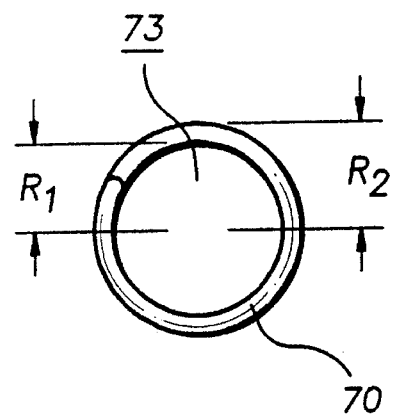
FIG. 3 is an end view of the spring shown in FIG. 2.

FIG. 3 is an end view of spring 70 illustrating internal radial spring dimension $R_1$ and external radial spring dimension $R_2$. An interior spring cavity 73 is defined within spring 70. Spring cavity 73 defines a passageway for knob clutch element 60 as knob 20 transitions from the first predetermined position to the second predetermined position.

Figure 4:
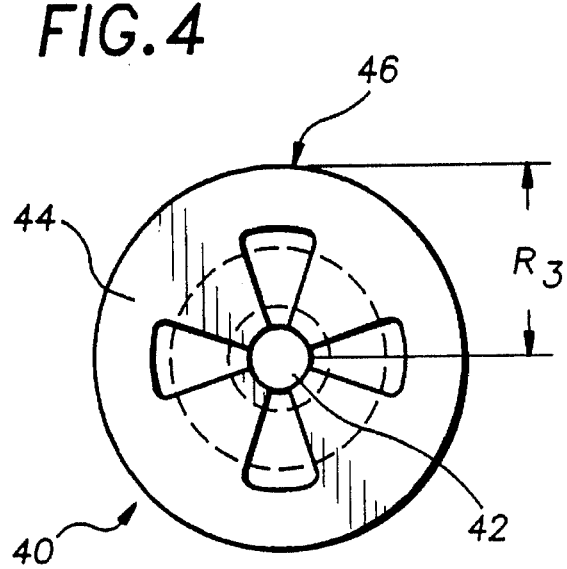
FIG. 4 is a frontal view of an embodiment of the valve stem clutch element.

FIG. 4 shows a frontal view of valve stem clutch element 40. Valve stem clutch element 40 has an aperture 42 therethrough and a first engagement surface 44 thereon. Aperture 42 passes through the center of first engagement surface 44. First engagement surface 44 has a circular perimeter 46 having a one inch (1") first engagement surface radial dimension $R_3$.

Figure 5:
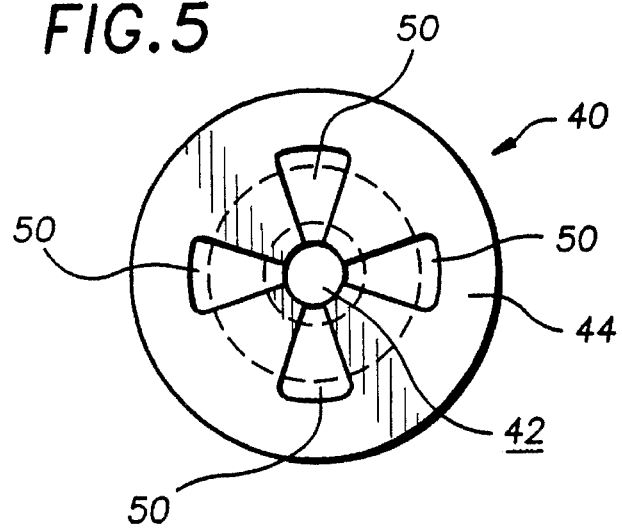
FIG. 5 is a frontal view of the valve stem clutch element of FIG. 4 with first raised surfaces.

Referring to FIG. 5, the exemplary embodiment of first engagement surface 44 of valve stem clutch element 40 has four (4) first raised surfaces 50 radially extending from aperture 42 thereon. The radial extension of first raised surfaces 50 is less than internal radial spring dimension $R_1$ (FIG. 3). In the exemplary embodiment the radial extension of first raised surfaces is three-eights inch (⅜") from the center of first engagement surface 44.

Figure 6:
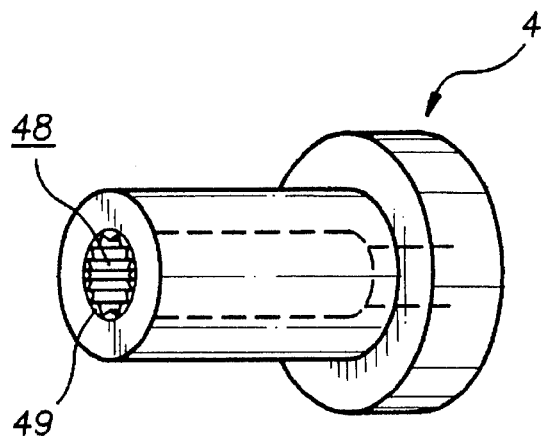
FIG. 6 is a rear perspective view of the valve stem clutch element of FIG. 4.

Referring to FIG. 6 a rear perspective view of valve stem clutch element 40 is shown with a recessed cavity 48. Recessed cavity 48 has raised ridges 49 thereon. Raised ridges 49 run parallel to recessed cavity 48. In use, valve stem 12 is insertable into recessed cavity 48. In the exemplary embodiment recessed cavity raised ridges 49 engage valve stem raised ridges 16 so that valve stem 12 may not rotate independently of valve stem clutch element 40.

Figure 7:
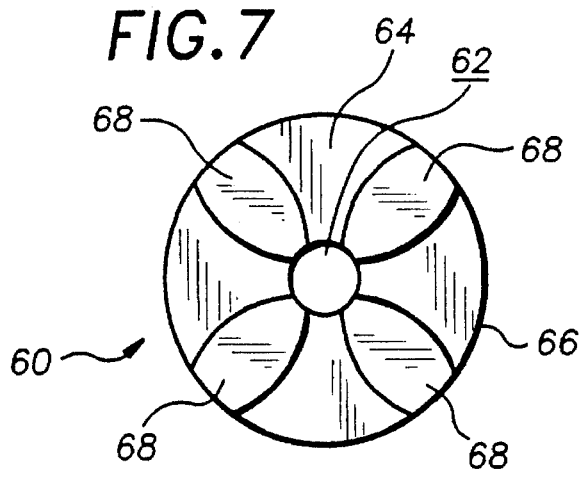
FIG. 7 is a front elevation of an embodiment of the knob clutch element.

FIG. 7 shows a front elevation of knob clutch element 60. Knob clutch element 60 has aperture 62 therethrough. Knob clutch element 60 has a second engagement surface 64 with a substantially circular perimeter 66. Aperture 62 passes through the center of second engagement surface 64. In the exemplary embodiment second engagement surface 64 has four (4) second raised surfaces 68 thereon. Second raised surfaces 68 radially extend from aperture 62 to perimeter 66. Second raised surfaces 68 cover 40 percent (40%) of second engagement surface 64.

Figure 8:
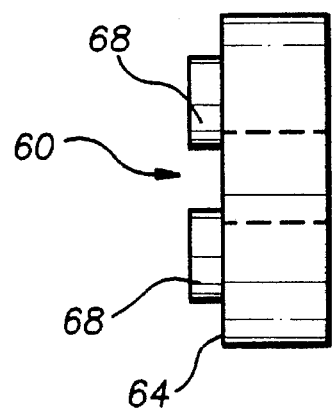
FIG. 8 is a side elevation of the knob clutch element of FIG. 7.

FIG. 8 is a side view of knob clutch element 60, second engagement surface 64 and two (2) of four (4) second raised surfaces 68.

Figure 9:
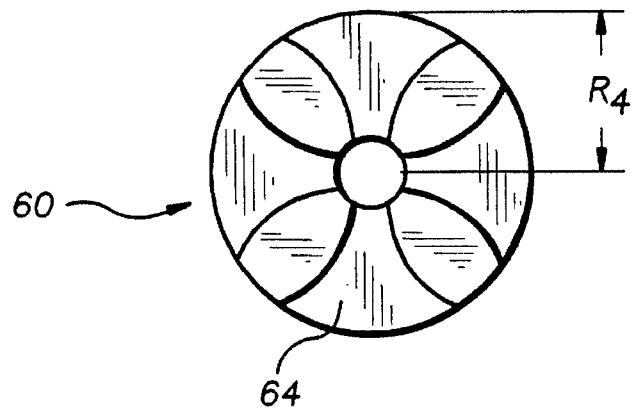
FIG. 9 is a front elevation of the knob clutch element of FIG. 7.

Referring to FIG. 9 second engagement surface 64 of knob clutch element 60 has a second engagement surface radial dimension $R_4$. Second engagement surface radial dimension $R_4$ is less than internal radial spring dimension $R_1$ of spring 70 (FIG. 3). In the exemplary embodiment second engagement surface radial dimension $R_4$ is ⅜" and is equal to the radial extension of first raised surfaces 50 (FIG. 5).

Figure 10:
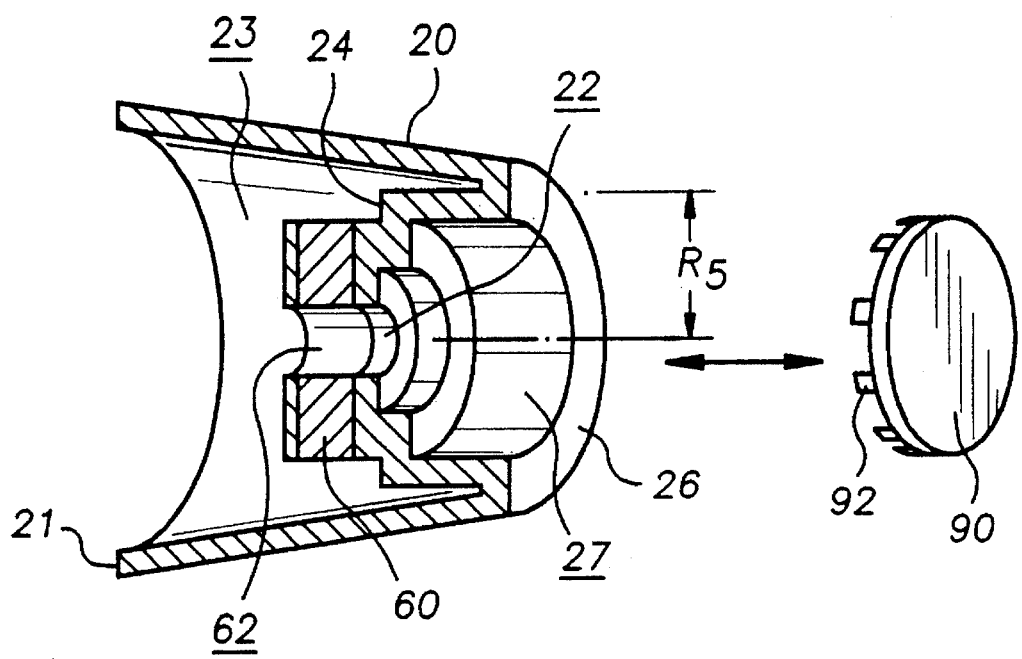
FIG. 10 is an exploded cross section of the knob in connection with the knob clutch element.
Figure 12:
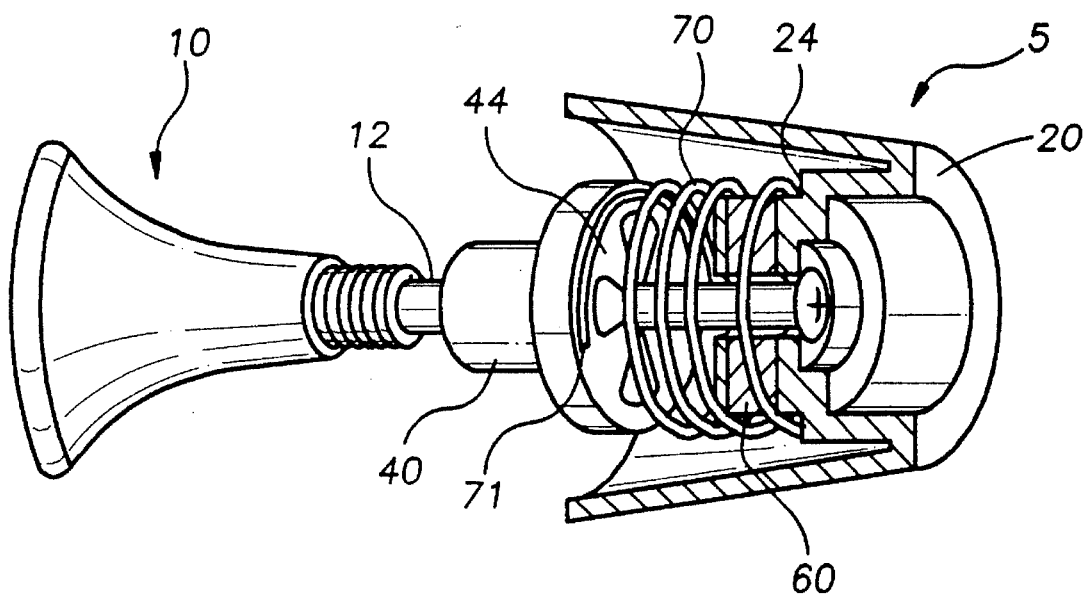
FIG. 12 is an illustration of the faucet safety handle in use in the first predetermined position with the knob clutch element disengaged from the valve stem clutch element.
Figure 13:
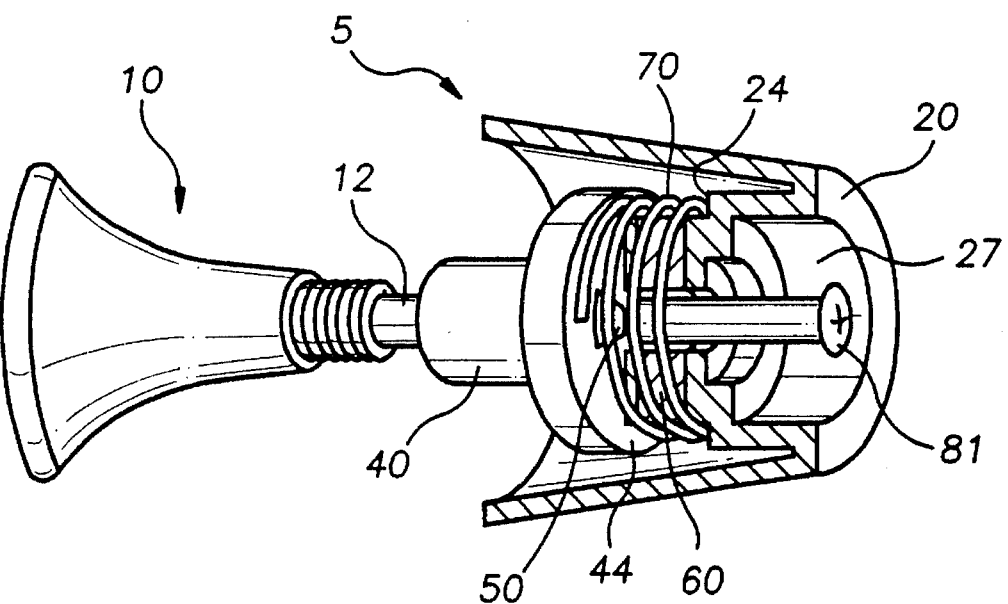
FIG. 13 is an illustration of the faucet safety handle in use in the second predetermined position with the knob clutch element engaged with the valve stem clutch element.

Referring to FIG. 10 a cap 90 and cross sections of knob 20 and knob clutch element 60 are shown. Knob 20 has a first end 21 and a second end 26. Knob 20 has a first cavity 23 open on first end 21 of sufficient diameter to allow entry of spring 70, and valve stem clutch element 40 therein (FIGS. 12 & 13). Knob clutch element 60 is fixedly attached to knob 20 such that knob clutch element aperture 62 is in substantial alignment with knob aperture 22. In the exemplary embodiment knob clutch element 60 is adhesively mounted to knob 20. First cavity 23 has a substantially circular knob shoulder 24 formed therein. Knob shoulder 24 has an external shoulder radius $R_5$ greater than external radial spring dimension $R_2$ of spring 70 thus serving to maintain second end 72 in proper position within knob 20 (FIG. 2). Knob 20 has a second cylindrical cavity 27 open on second end 26. The exemplary embodiment includes cap 90 having attachment tabs 92. Tabs 92 are insertable into second cavity 27.

Figure 11:
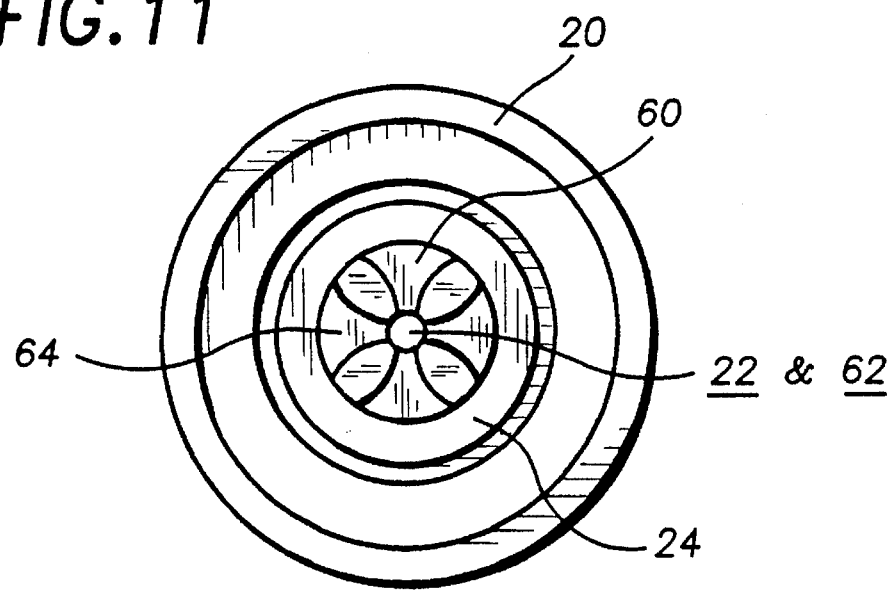
FIG. 11 is an end view of an embodiment of the knob and the knob clutch element.

FIG. 11 is a rear elevation of knob 20 with knob clutch element 60 attached. Knob aperture 22 and knob clutch element aperture 62 are in substantial alignment to allow bolt 80 (FIG. 1) to pass therethrough. Knob shoulder 24 and first engagement surface 64 are substantially circular in shape.

FIG. 12 shows faucet safety handle 5 in the first predetermined position wherein knob 20 may rotate freely with respect to valve stem 12. In the first predetermined position valve stem clutch element 40 is disposed from knob clutch element 60 by spring 70. First end 71 of spring 70 contacts valve stem clutch element 40 on first engagement surface 44. Second end 72 of spring 70 (FIG. 2) contacts knob shoulder 24. In use, an external force is required to reposition knob 20 from the first predetermined position to the second predetermined position as shown in FIG. 13.

FIG. 13 illustrates faucet safety valve 5 in the second predetermined position wherein rotation of knob 20 causes rotation of valve stem 12. In the second predetermined position valve stem clutch element 40 contacts knob clutch element 60. In the exemplary embodiment first raised engagement surfaces 50 pass second raised surfaces 68 (FIG. 8) while the knob transitions from the first to the second predetermined position thus engaging valve stem clutch element 40 with knob clutch element 60. First engagement surface 44 contacts second raised surfaces 68 (FIG. 8) and second engagement surface 64 (FIG. 8) contacts first raised surfaces 50. Knob clutch element 60 passes through interior spring cavity 73 (FIG. 3) as spring 70 is compressed. Bolt head 81 is maintained within second cylindrical cavity 27 when knob is in the second predetermined position. When the external force is removed spring 70 urges knob 20 to the first predetermined position such that knob 20 contacts bolt head 81.

It can be seen from the preceding description that a device for preventing accidental or inadvertent operation of a faucet by an infant but that is easily operated by an adult and that is readily adaptable to an existing faucet valve stem has been provided.

It is noted that the embodiment of the faucet safety handle described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A faucet safety handle for use in conjunction with a valve having a rotatable valve stem comprising:

a knob having a first and second cavity open on first and second ends of said knob, respectively, an aperture therethrough in connection with said first and second cavities, and a removable cap securable to said knob in a manner to block access to said second cavity;

a clutch mechanism connectable between said knob and said valve stem such that in use said knob rotates freely with respect to said valve stem when said knob is in a first predetermined position and said valve stem rotates in conjunction with said knob when said knob is in a second predetermined position, said clutch mechanism including: a valve stem clutch element, functionally connectable with said valve stem, having a valve stem clutch element aperture therethrough and a first engagement surface having a substantially circular perimeter with a first engagement surface radial dimension, said first engagement surface having a plurality of first raised surfaces radially extending from said valve stem clutch element aperture, said valve stem clutch element aperture being substantially centered on said first engagement surface and passing therethrough; a knob clutch element, fixedly attached to said knob within said first cavity, having an aperture therethrough and a second engagement surface having a substantially circular perimeter with a second engagement surface radial dimension such that when said knob is in said second predetermined position at least a portion of said first engagement surface contacts at least a portion of said second engagement surface, said second engagement surface having a plurality of second raised surfaces radially extending from said knob clutch element aperture, said knob clutch element aperture being substantially centered on said second engagement surface and passes therethrough, said first raised surfaces extend radially a distance, less than said first engagement surface radial dimension and equal to said second engagement surface radial dimension, said second raised surfaces covering less than 50 percent of said second engagement surface; and biasing means disposed between said first engagement surface and said knob such that said knob is urged by said biasing means toward said first predetermined position and away from said second predetermined position, said biasing means including a helical coil spring having a first and second end, and an external radial spring dimension less than said first engagement surface radial dimension and an internal radial spring dimension greater than said second engagement surface radial dimension, said first end of said spring being in contact with said first engagement surface and said second end being in contact with said knob, said helical coil spring defining an interior pathway between said first and second ends through which said second engagement surface passes as said knob transitions from said first predetermined position to said second predetermined position, said spring interior pathway being in substantial alignment with said knob aperture; and connecting means for functionally securing said knob to said valve stem, said connecting means including a bolt having a head and an elongated shaft; said bolt head being located within said second cavity; said bolt head being maintained at a fixed distance from said valve stem and within said second cavity as said knob moves from said first predetermined position to said second predetermined position, at least a portion of said bolt head contacting said knob in said first predetermined position;

said knob aperture, said spring, said knob clutch element aperture, and said valve stem clutch element aperture surround at least a portion of said elongated shaft of said bolt, said first and second raised surfaces being patterned such that at least a portion of said first raised surfaces may pass at least a portion of said second raised surfaces as said knob transitions from said first to said second predetermined position.

\* \* \* \* \*